(No Model.) 10 Sheets—Sheet 8.
W. J. HOOPER, G. T. PILLINGS & G. W. PRICE.
MACHINE FOR MAKING NETS.

No. 454,355. Patented June 16, 1891.

(No Model.) 10 Sheets—Sheet 9.
W. J. HOOPER, G. T. PILLINGS & G. W. PRICE.
MACHINE FOR MAKING NETS.

No. 454,355. Patented June 16, 1891.

(No Model.) 10 Sheets—Sheet 10.

W. J. HOOPER, G. T. PILLINGS & G. W. PRICE.
MACHINE FOR MAKING NETS.

No. 454,355. Patented June 16, 1891.

Witnesses
D. A. Tauberschmidt
L. P. Whitaker

Inventor
W. J. Hooper
G. T. Pillings
G. W. Price
By their Attorneys
Johnston, Rundel & Dyre

THE NORRIS PETERS CO., PHOTO-LITHO., WASHINGTON, D. C.

UNITED STATES PATENT OFFICE.

WILLIAM JOHN HOOPER, GEORGE T. PILLINGS, AND GEORGE W. PRICE, OF BALTIMORE, MARYLAND; SAID PILLINGS AND PRICE ASSIGNORS TO SAID HOOPER.

MACHINE FOR MAKING NETS.

SPECIFICATION forming part of Letters Patent No. 454,355, dated June 16, 1891.

Application filed October 3, 1890. Serial No. 366,953. (No model.)

*To all whom it may concern:*

Be it known that we, WILLIAM JOHN HOOPER, GEORGE T. PILLINGS, and GEORGE W. PRICE, citizens of the United States, residing at Baltimore, in the State of Maryland, have invented certain new and useful Improvements in Machines for Making Nets; and we do hereby declare the following to be a full, clear, and exact description of the invention, such as will enable others skilled in the art to which it appertains to make and use the same.

Our present invention relates to the art of making nets, and has for its object the production of a machine for knotting cords or threads for nets which shall be of simple construction, but rapid and effective in operation.

The best form in which we have contemplated embodying our invention is illustrated in the accompanying drawings, and said invention is fully disclosed in the following specification and claims.

In the drawings, Fig. 5 is a partial sectional view at right angles to the section shown in Fig. 4, with parts removed; Fig. 5ª, a detail plan view of part of the cast-off bar, the toggle-levers, and links at one end of the machine.

In our present machine the netting is formed from warp threads or cords which extend through the machine from front to rear, and with which are tied shuttle threads or cords, each shuttle or carrier thread being knotted to two adjacent threads, first to one and then to the other in regular alternation.

In the figures of the drawings, A A indicate the end pieces or standards, which may be of any suitable or preferred construction, and which are united at convenient points with suitable connecting or tie beams or bars to form a rigid supporting-frame for the operative parts of the machine.

At the rear of the machine is placed in suitable bearings in the end pieces or standards of the frame a main or driving shaft L, to which power is applied in any suitable or preferred manner. This shaft is provided with a spur-gear T, which gears with a toothed wheel T' on a shaft M, and this wheel gears with a spur-gear T² on a shaft N at the front of the machine. All of the moving parts of the machine are actuated from these shafts.

On a platform B, near the base of the frame, we mount a suitable number of spindles to receive the spools or bobbins C, containing the warp cords or threads. From these bobbins the warp cords or threads $c$ extend to the front of the machine, to and partially around a rod $b$, thence upward to a warp tension device, thence upward to let-off devices, thence to and partially around a rod $b'$, thence to a thread-carrier G $g$, and thence past the fingers of the finger-bars H and I to the take-up mechanism.

Figure 2:
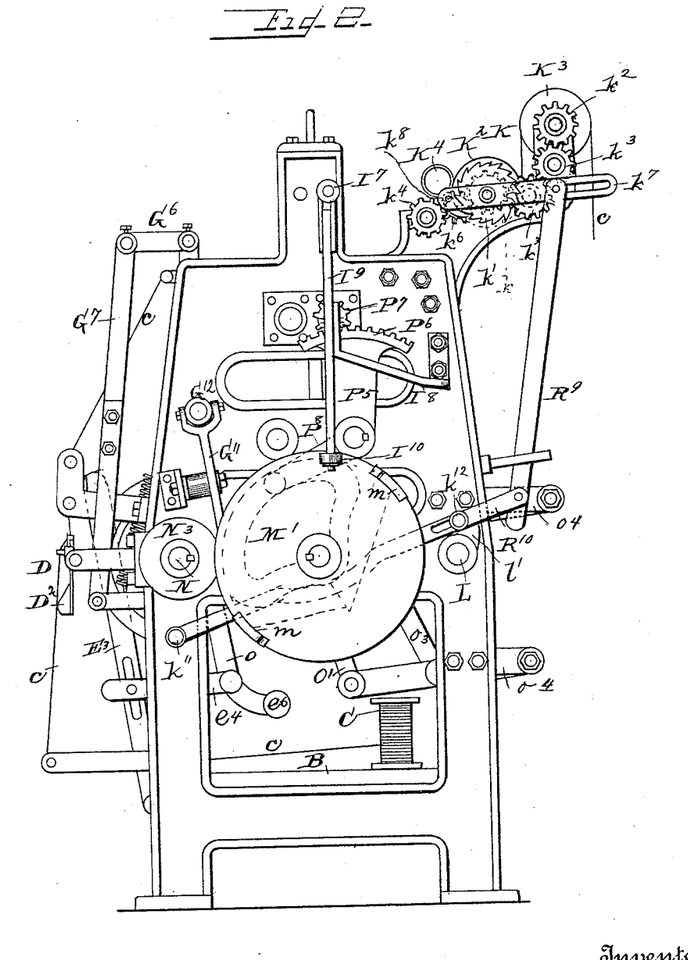
Fig. 2 is a view of the right end, or looking toward the right, of Fig. 1.
Figure 3:
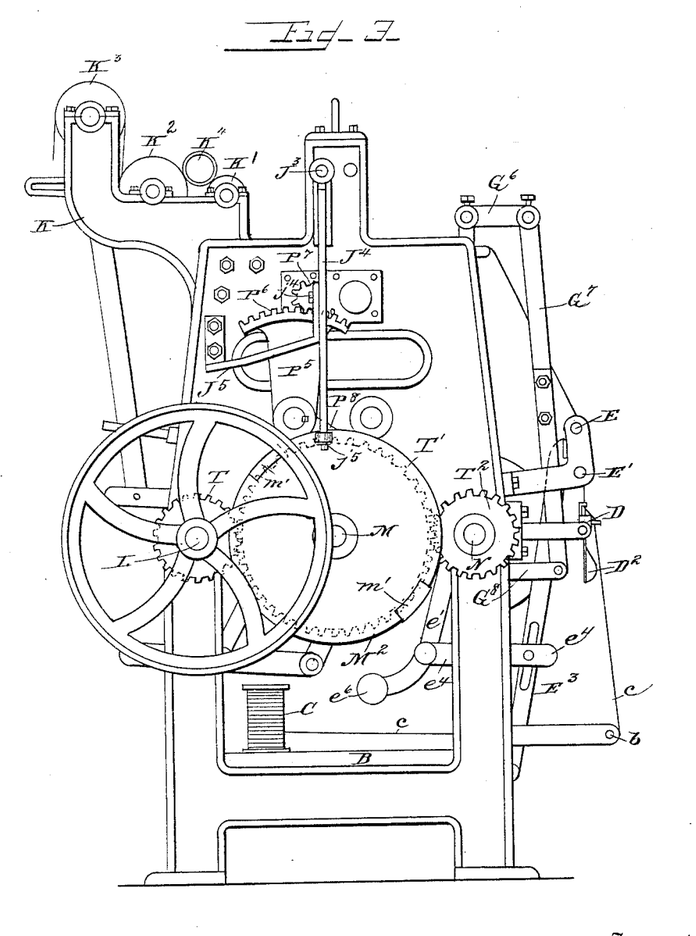
Fig. 3 is a view in elevation of the left end of the machine, or looking toward it from the left of Fig. 1.
Figure 4:
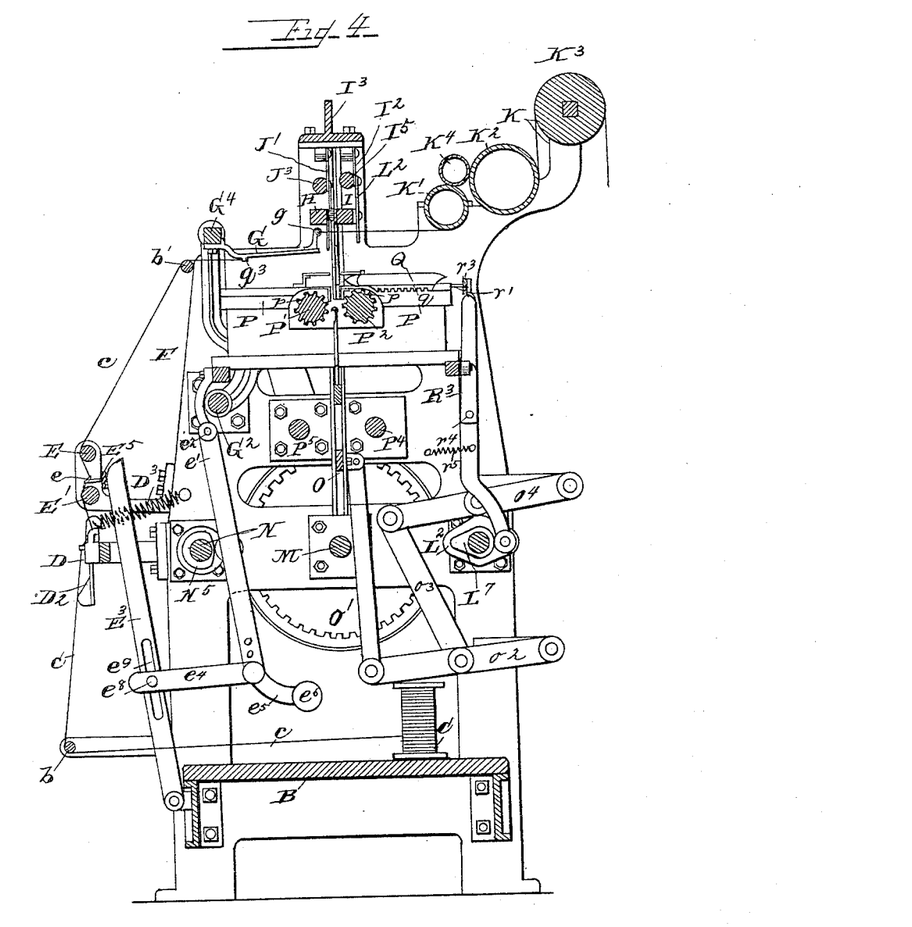
Fig. 4 is a vertical section from front to rear.
Figures 5, 5A:
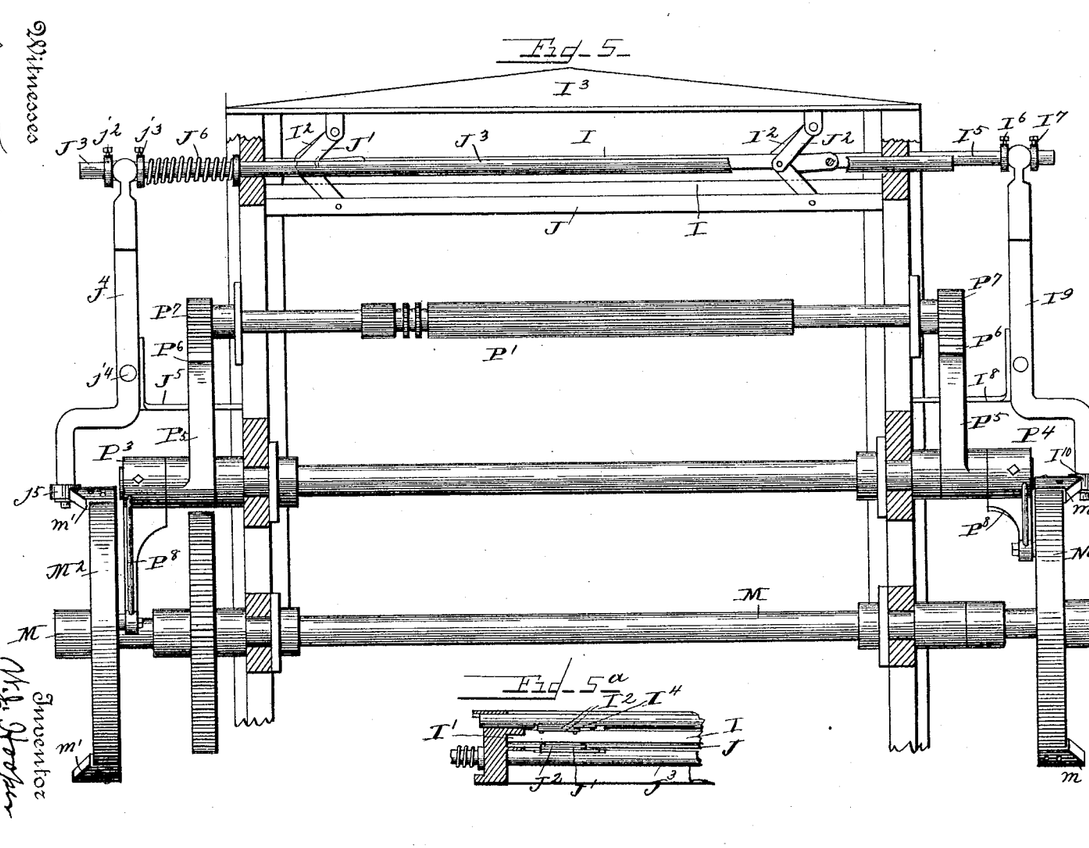
Figure 6:
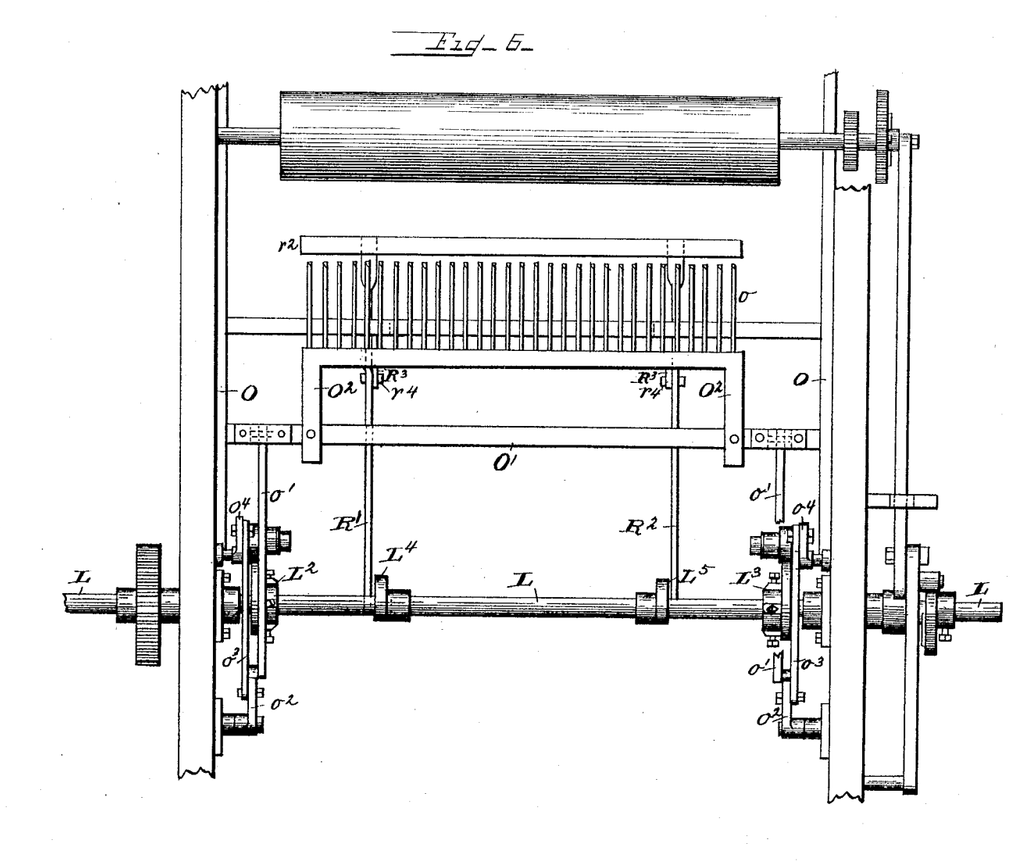
Fig. 6 is a partial view from the rear of the machine.
Figure 7:
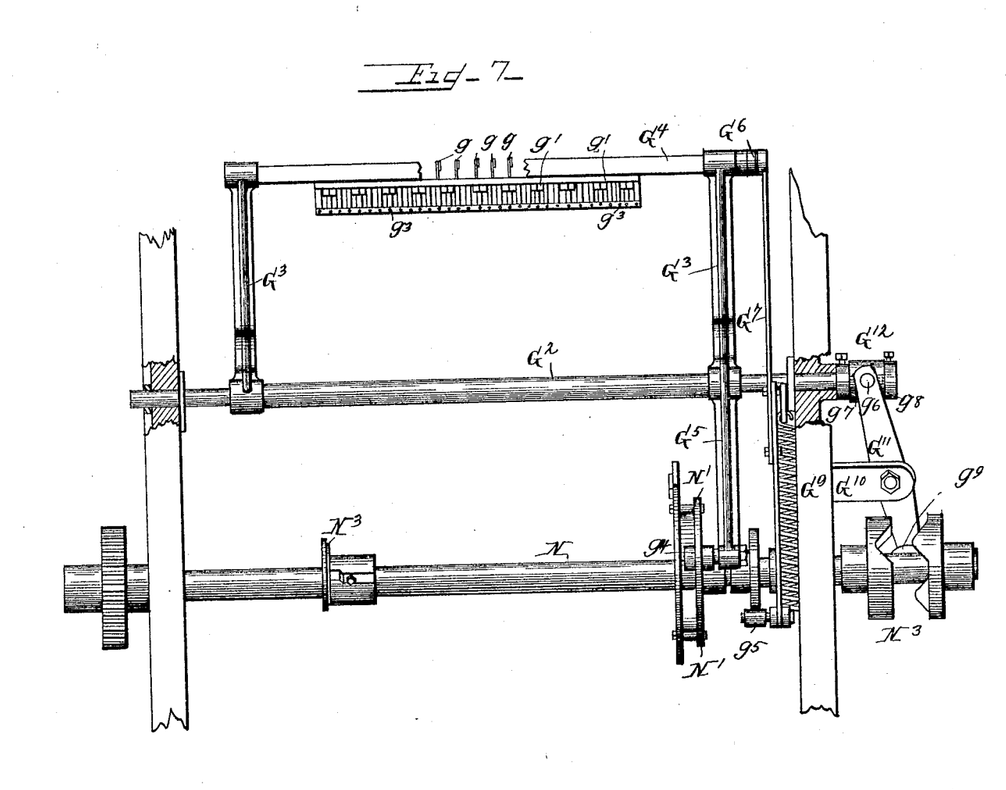
Fig. 7 is a view of detached parts, looking toward the front of the machine.

The group of devices which we have termed the "take-up" mechanism is best shown in Figs. 2, 3, and 5. On rearwardly-extending portions of the frame K are mounted the take-up rollers K' K² K³, the shafts of which are journaled in suitable bearings in or attached to the frame-extension, and the loose or free roller K⁴ rests upon and partially between the rollers K' and K² and engages with the peripheries of both of these rollers. These rollers we prefer to actuate from the main or driving shaft L through the following instrumentalities: The shafts of the rollers project beyond the frame at one end of the same. The shaft of roller K² is provided with a gear-wheel $k$ and a ratchet $k'$. The shaft of roller K³ is provided with a gear-wheel $k^2$, and idle-wheels or pinions $k^3$ are mounted on studs secured to the frame and operatively connect wheels $k$ and $k^2$. The shaft of roller K' is provided with a gear-wheel $k^4$, and an idle-wheel or pinion $k^6$ connects it with the pinion $k$ on the shaft of roller K². An arm or lever $k^7$ is also pivoted on the shaft of roller K², which is provided with a pawl $k^8$, engaging the teeth of the ratchet-wheel $k'$. The arm or lever $k^7$ is slotted, and a link R⁹ is pivoted thereto by a bolt passing through the slot. This link extends downward and is pivoted to a lever R¹⁰, pivoted at $k^{11}$ to the frame of the machine. This lever R¹⁰ near its rear end is provided with a friction-roll $k^{12}$, which engages a cam $l'$ on the main or driving shaft L. The pawl $k^8$ is so constructed and placed that the ratchet $k'$ is engaged thereby and the take-up mechanism operated when the lever R¹⁰ and link K⁹ are raised by the cam, the weight of the parts being sufficient to return them to their lowest position after the friction-roll has passed the elevated portion of the cam-grade. By adjusting the link to and from the shaft of roller K² in the slot of the arm $k^7$ the extent of movement imparted to the take-up rollers is increased or diminished, as desired.

The cords or the netting as it comes from the knotting mechanism passes under and partially around the roller K', over and partially around the loose or free roller K⁴, under and partially around the roller K², and then over the roller K³. By this construction the netting is gripped or pressed by the weight of the loose or free roller against the peripheries of rollers K' and K², and a strong and effective pull is secured to advance the fabric and tighten the knots when a row of the latter has been completed.

Forward of the take-up mechanism at the top of the machine are two finger-bars H and I. (Best seen in Figs. 8, 9, 10, and 12.) The finger-bar H is rigidly secured in position by attachment to the frame of the machine. It is provided with points or fingers $h$, secured to the rear side of the bar and projecting below it. Each of said points or fingers is provided with a cord-recess $h'$, the lower edge of which slopes or inclines downwardly outward or toward the edge of the point or finger. Below this recess the point or finger has its edges provided with slight concavities $h^2\ h^3$, so that when the warp-cords are drawn around them in looping the cord for the knot it will not slip downward and off from the point or finger.

In rear of the stationary finger-bar H are guides I' I', secured to the frame of the machine, and a movable point or finger-bar I has its ends fitted to these guides and is adapted to move upward and downward upon or within the same. A pair of toggle-levers I² I² connect this bar near each end of the same, or near each end of the machine, with a cross-beam I³, extending from side to side of the machine above the finger-bars. The central pivots of the toggle-levers I² I² are connected by links I⁴ to a rod or bar I⁵, sliding in bearings at the sides of the machine. This rod or bar I⁵ extends to the right beyond the frame of the machine and is provided with two collars I⁶ and I⁷, adjustably secured to the rod by set-screws. At the same end of the machine a bracket I⁸ is secured upon the outside of the frame, and a lever I⁹ is pivoted to this bracket. This lever I⁹ is forked at its upper end and extends on both sides of the rod or bar I⁵ between the collars I⁶ I⁷. Its lower end is provided with a friction-roll I¹⁰, which bears against the outer face of the cam-disk M', mounted on shaft M at the right of the machine. This disk has two cam projections $m\ m$ in the path of the friction-roller, and by engagement therewith force the rod I⁵ inward and raise the bar I. The weight of the bar returns it to its lowest position when the friction-roller has passed the cam-grades.

Figures 8, 9, 10, 11:
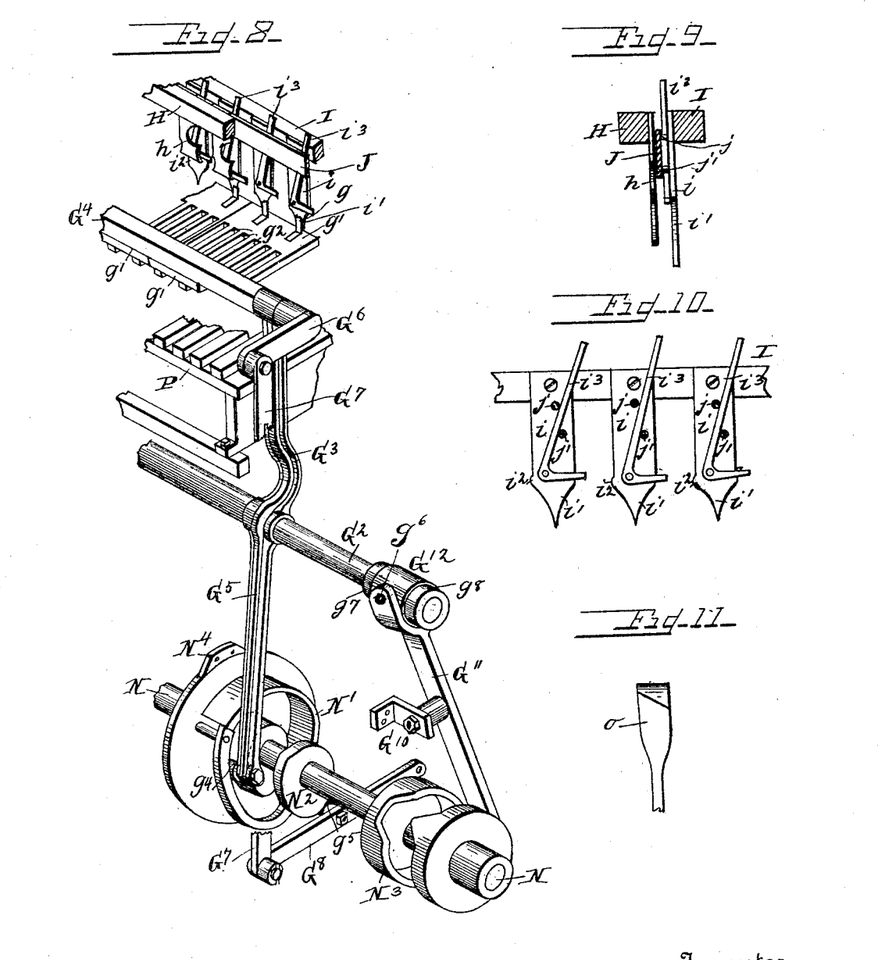
Fig. 8 is a partial perspective of the same parts.
Fig. 9 is a section from front to rear through the finger-bars and their accompanying cast-off bar.
Fig. 10 is a partial front view of the rear finger-bar.
Fig. 11 is a front view of one of the hooks of the hook-bar.

The bar I is provided with pointed fingers $i$, attached to the front side of the bar and extending below the same. These points or fingers are longer than the points or fingers $h$ of the stationary finger-bar, and they extend slightly below them, as seen in Fig. 9. The fingers or points $i$ are pointed, as shown, and the inclined edge of the tapering portion constituting the tip of the finger on the right is concaved, as shown at $i'$. The opposite side of the tip may be either straight or of a like concavity. On the edge of the finger opposite the concavity $i'$ the finger is provided with a rounded shoulder $i^2$. To the front side of each of these fingers $i$ is pivoted a small bell-crank lever $i^3$, the horizontal arm of which extends beyond the edge of the finger at the side opposite the shoulder $i^2$, forming a cord rest or support, and for this reason said levers are called "cord-levers." The other arm of the lever $i^3$ extends upwardly in an inclined direction. Between the bars H and I is placed a bar J for casting off the loops of the warp-thread from the fingers. The said bar comes in contact with the loops and casts them off the fingers as the bar I rises. This bar is provided with two pins $j\ j'$ for each of the cord-levers $i^3$, and these pins engage the opposite edges or sides of the upwardly-extending arms of those devices. Two toggle-levers J' J² connect this bar with the cross-bar I³ of the frame, and the central pivot of each of these levers is connected by a link with a rod $J^3$, sliding in bearings in the sides of the frame of the machine. The rod $J^3$ extends at the left of the machine beyond the framing and is provided near its end with two collars $j^2 j^3$. The rod between these collars is embraced by the forked end of a lever $J^4$, pivoted at $j^4$ to a bracket $J^5$, secured to the frame of the machine, and the lower end of the lever is provided with a friction-roll $j^5$, which engages the outer face of a cam-disk $M^2$, mounted on shaft M. The disk $M^2$ is the counterpart of the disk M' at the opposite end of the machine and is provided with corresponding cam-surfaces $m' m'$. The bar J being quite thin and light, the friction-roll $j^5$ is kept in contact with the face of the cam-disk M' by a spring $J^6$, placed on the rod $J^3$ between the collar $j^3$ and the frame of the machine.

It will be seen that as the toggle-levers are bowed in the same direction the movements imparted to the rods $I^5$ and $J^3$ will cause the bars I and J to move in opposite directions, the bar I moving upward and the bar J moving downward.

The fingers of the bars H and I are equal in number and are placed in line with or opposite each other. In the operation of tying a knot the warp-cords are carried around and placed upon a finger of the stationary finger-bar and a finger of the movable finger-bar, as shown in Fig. 12 and more particularly described hereinafter, by a cord or thread carrier, which we will now proceed to describe.

At the front side of the machine a shaft $G^2$ is mounted in suitable bearings at each end of the machine, so as to rock and slide therein. To this shaft are rigidly secured upwardly-extending arms $G^3$, and in the upper ends of the arms $G^3$ is journaled a bar $G^4$. To the rear of the bar $G^4$ are the cord-carriers $g$ $g$, which consist of vertically-extending pins provided at their upper ends with eyes through which the warp-cords are threaded. These carriers are rigidly connected to and supported by the bar $G^4$, and this connection may be of many different characters. Each carrier might be connected to the bar $G^4$ by a single arm or rod, or the carriers might all be attached to and supported by a single bar extending the distance desired and this bar connected with bar $G^4$ by two or more arms rigidly connected to both, or they might be secured to the outer edge of a plate having its opposite edge rigidly secured to the bar $G^4$. In the drawings the cord-carriers are shown connected to the bar $G^4$ by a series of sections $g' g'$, secured to the under side of the same. These sections have a solid portion at the point of attachment to bar G and a solid portion to which the carriers are secured, and intermediate these portions are formed with slots $g^2$. These sections have a downward curve rearward of the bar $G^4$, and at their lowest point are provided with a rib $g^3$, through which are holes or eyelets for the passage of the warp-cords. The cords after passing through these eyelets extend to the rear edge of the sections $g' g'$, where they rise vertically beside the carriers and pass through the eyelets of the same.

Figures 17, 18, 19, 20, 22, 24:
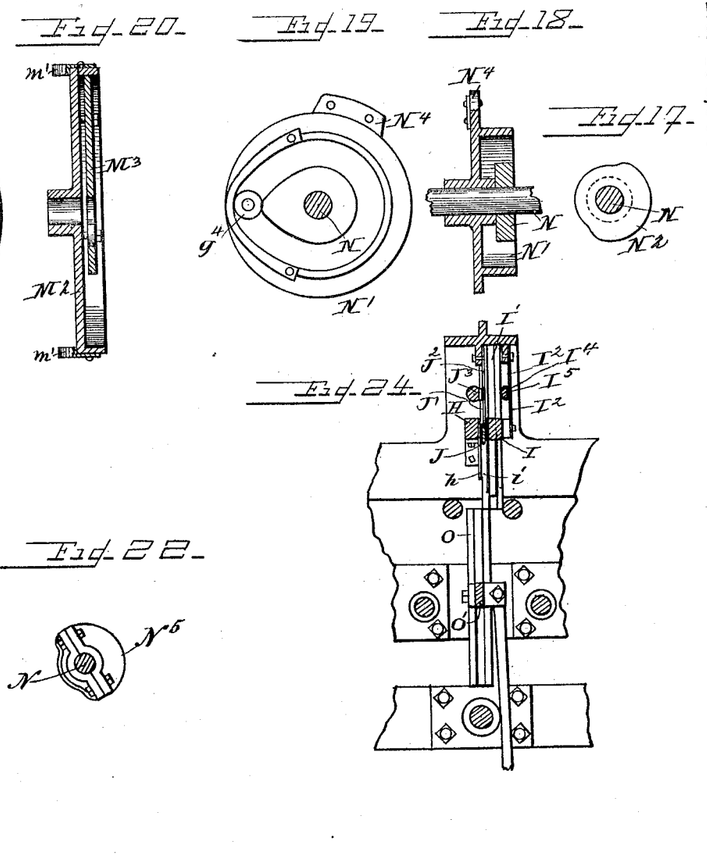
Figs. 17 to 23 are detail views of certain cams.
Fig. 24 is a partial section of the machine from front to rear.
Figure 21:
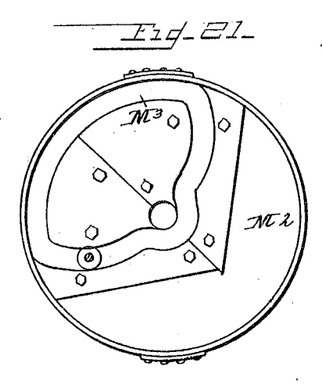
Figure 23:
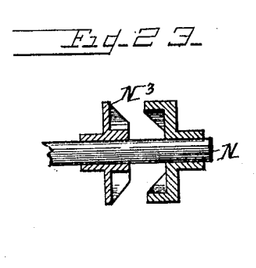

At the beginning of the series of operations to form the knots the cord-carriers form a loop of a warp-cord on and around each finger $h$ of the stationary finger-bar and the finger $i$ of the movable finger-bar opposite to it or in line therewith, and the necessary movements to accomplish this are given the carriers by the following instrumentalities: The movements from the front toward the rear and from the rear toward the front of the machine are imparted by the grooved cam N', (shown in detail in Fig. 19,) mounted on the shaft N. This cam acts upon a friction-roller $g^4$, projecting from one side of the arm $G^5$, rigidly secured to the shaft $G^2$. An arm $G^6$, rigidly secured to the bar $G^4$, is connected by a link $G^7$ with a lever $G^8$, pivoted to the frame of the machine, and which is provided with a friction-roll $g^5$, engaging a cam $N^2$ on the shaft N. (Shown in detail in Fig. 17.) The arms $G^3$ and $G^5$ are made in one piece, as shown, but may, if desired, be made in two separate pieces, each having a hub by which to secure it to the shaft $G^2$. The friction-roll $g^5$ is maintained in contact with the periphery of this cam by a spring $G^9$, and this cam and spring serve to impart the necessary vertical movements to the carriers by rocking the bar $G^4$ in its bearings. The necessary movements of the carriers from one end of the machine toward the other are given by the following parts: A bracket $G^{10}$ is secured to the outside of the frame of the machine, to which is pivoted a lever $G^{11}$. This lever is bifurcated at its upper end, and each of the resulting parts is pivoted to a sleeve $G^{12}$ on the shaft $G^2$. One of the points of pivoting is shown at $g^6$. The shaft $G^2$ is free to turn in the sleeve $G^{12}$, which is secured from endwise movement upon the shaft by the collars $g^7 g^8$, adjustably secured to the shaft by set-screws. The other end of the lever $G^{11}$ is provided with a friction-roll $g^9$, which engages with the groove in the periphery of the cam $N^3$ on the shaft N. (Shown in section at Fig. 23.) As both sides of the cam-groove engage the friction-roller $g^9$ the shaft $G^2$ will be moved positively in both directions by the cam.

Figure 12:
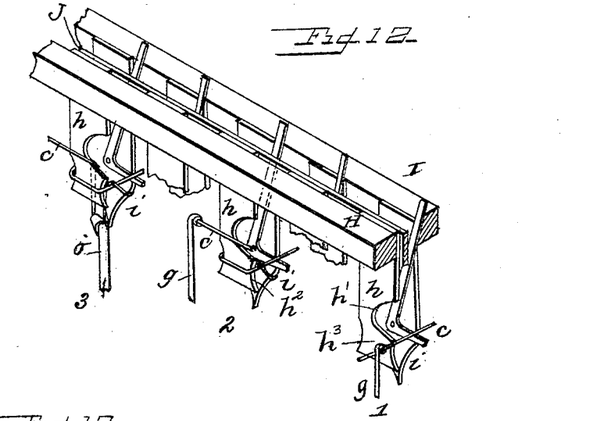
Fig. 12 is a partial perspective of the two finger-bars and the cast-off bar, showing the position of the thread at different stages of the operation of forming a knot, alternate teeth being broken away for the sake of clearness.

When the machine is in operation and the knotting devices are about to enter upon the series of movements to form a row of knots across the machine, each carrier occupies a position relatively to each pair of fingers $h$ and $i$ substantially as shown at 1, Fig. 12. The cams $N' N^2 N^3$ are constructed and arranged so that upon the rotation of the shaft N the carrier moves to the left across the front of the finger $h$, drawing the cord firmly against the concavity of the right edge of the same. The carrier then moves backward, drawing the cord against the concave portion $h^3$ of the left edge and laying it against the left edge of the finger $i$ above the shoulder $i^2$. The carrier then moves to the right and downward and then forward, drawing the cord against the concave side $i'$ of the finger $i$. The carrier continues to move forward, and at the same time moves upward, and after passing the finger $h$ moves to the left, carrying the cord against the inner edge of the recess in the finger $h$, as shown at 2, Fig. 12, in which position it is ready to be engaged and drawn downward to form loops for the passage of the shuttle. Below the finger-bars H and I the frame of the machine is provided with vertical guides O O, which may be a continuation of guides I I', and the ends of a bar O' are fitted to these guides. To this bar is attached the frame $O^2$, to the upper side of which are secured the hooks $o$, having the construction most clearly shown in Fig. 11. The hooks are of less width than the fingers $h$ and $i$, and the tips of the same have an inclined lower edge terminating in a point at the right side. One hook is provided for each pair of fingers $h$ and $i$, and the construction and arrangement are such that when raised to its highest position each hook will be midway between the fingers $h$ and $i$, with the point of its hook slightly above the portion of the cord extending from the side $i'$ of the finger $i$ into the recess of the finger $h$ in such a position that on its moving downward it will engage that portion of the cord and carry it with it in its descent. The hook is shown at 3, Fig. 12, as having begun its descent with the cord, but considerably above its lowest position. As the cord is drawn diagonally across the space between the fingers the right side of the tip of the hook alone is over the cord. The tip is therefore given the shape shown, so that on its downward movement the point will seize the cord and the pressure of the cord against the inclined edge will spread the loop to the full width of the hook as it is drawn upward against the cord-seat between the tip and main body.

The bar O' and the hook-frame are raised at the time desired by the cams $L^2$ $L^3$ on the main or driving shaft L through the following connecting mechanism: To rearwardly-extending brackets secured to the framing of the machine are pivoted two levers $o^4$, having friction-rolls engaging the cams $L^2$ $L^3$, and two levers $o^2$. Each lever $o^4$ is connected with its adjacent lever $o^2$ by a link $o^3$, and each lever $o^2$ is connected with a bar O' by a link $o'$. The weight of the bar O', frame $O^2$, and the parts connected therewith is such as to maintain it in the lowest position permitted by the cams $L^2$ $L^3$, and hence the descent of the hooks $o$ is controlled by the cams, and they are thus caused to descend without shock or jar. When the hooks $o$ $o$ have descended to their lowest position, each carrying with it a loop of warp-cord, a shuttle or weft-cord is interlocked with every warp-cord less one by passing shuttles through all of the loops drawn down and held by the hooks $o$ $o$ except one. The warp cord or thread excepted is always a selvage-cord and is alternately the thread at the right and left sides of the fabric.

The raceways $p'$ for the shuttles are formed in a bed P, located in a horizontal plane between the finger-bars H I and the lowest position of the hooks $o$ $o$, with sufficient space between it and the finger-bars for the movement of the cord-carriers. This bed and the shuttle-raceways are divided by a slot running parallel with the hook-frame and finger-bars to permit the passage therethrough of the hooks and the loops carried thereby.

Figures 13, 14, 15, 16:
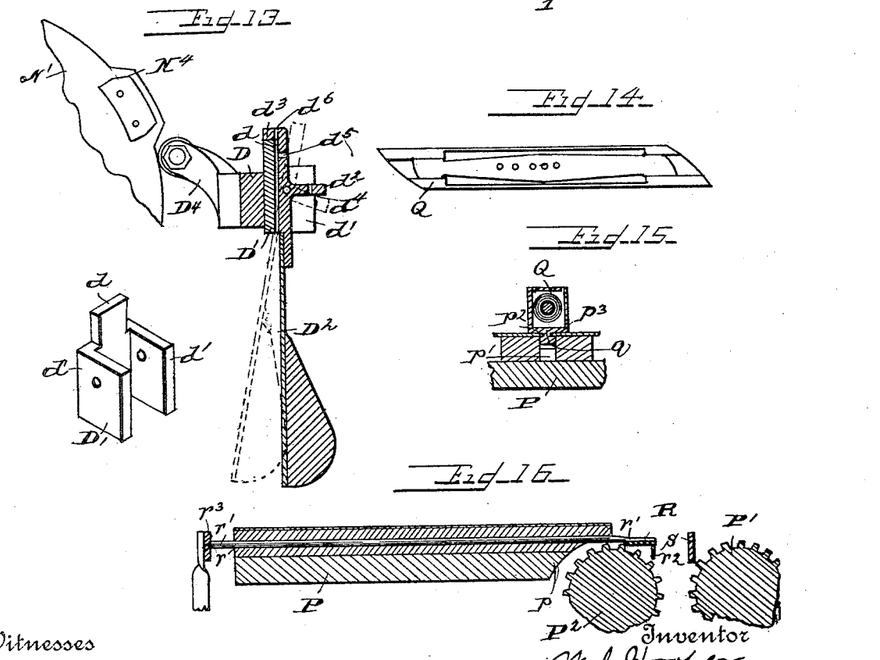
Fig. 13 is a sectional detail of the tension devices.
Fig. 14 is a top view of one of the shuttles.
Fig. 15 is a transverse section of a shuttle and its raceway.
Fig. 16 is a detail section showing manner of supporting the hook cast-off.

The under side of the bed at the edges forming the sides of the slot are cut away, as shown at $p$, Fig. 16. Two toothed or fluted rollers P' $P^2$, having the section of gear-wheels or pinions, have their shafts journaled in suitable bearings in such position that the ridges or teeth of the rollers are a little above the bottom of the shuttle-raceways. Below these rollers are two rock-shafts $P^4$ $P^5$, journaled in the frame of the machine, the one projecting beyond the frame to the right of the machine, the other to the left. Outside of the frame, at the left of the same, one shaft is provided with an arm $P^5$, provided with a geared sector $P^6$, gearing with a pinion $P^7$ on one of the roller-shafts. An arm $P^8$ on the same shaft extends downwardly in an inclined direction and is provided with a friction-roller engaging a cam-groove $M^3$ on the inner face of the cam-disk $M^2$. At the opposite end of the frame the other shaft is provided with a similar arm and sector, said sector gearing with a like pinion on the other roller-shaft. A similar arm rigidly connected to this shaft is provided with a friction-roller and engages a cam-groove of like configuration on the inner face of the cam-disk M'.

Figure 1:
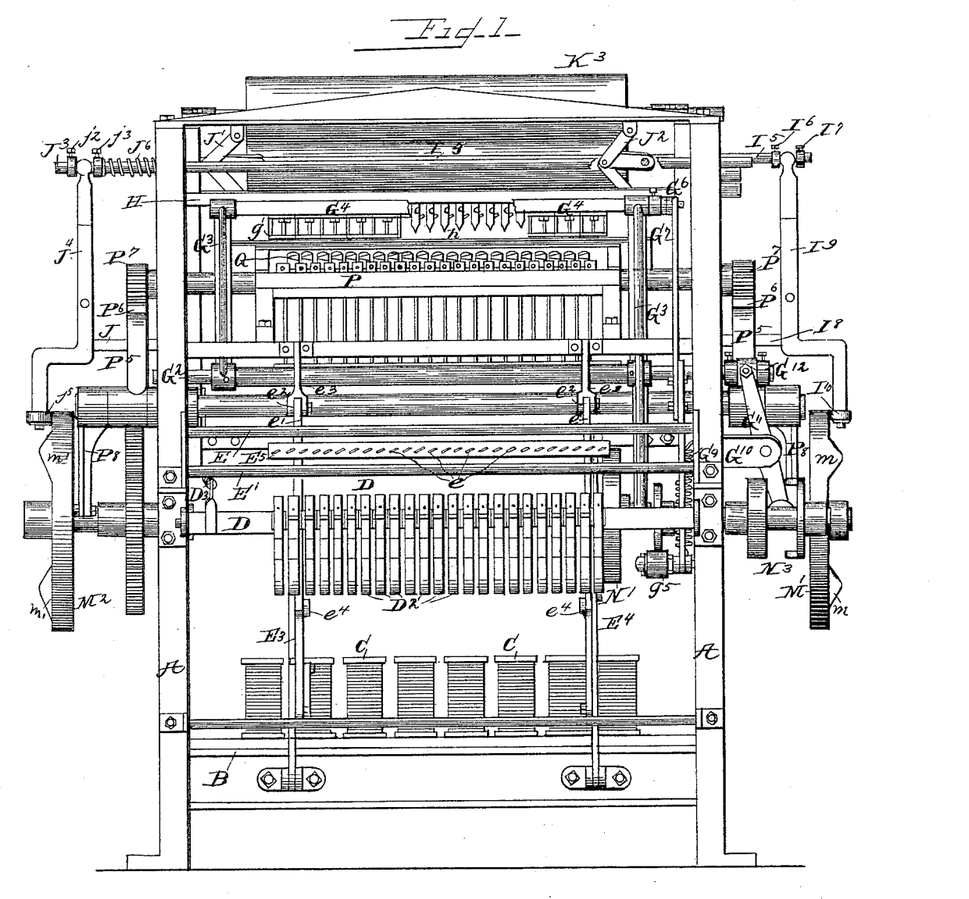
Figure 1 is a front elevation of our netting-machine.

The shuttle-raceways are one less in number than the points or fingers H, and are each located midway between two of such fingers, as shown in Fig. 1. Each raceway has the construction in section shown in Fig. 15, with inwardly-projecting flanges $p^2$ $p^3$. The shuttles Q Q have the form shown in Fig. 14 and are provided on the under side with a projecting rib $q$, provided with teeth forming a rack, as shown in Fig. 3, to engage the fluted or toothed rollers P' $P^2$. The shuttles are of such width that on moving across the slot in the shuttle-bed they come in contact with two of the loops drawn down by the hooks $o$ $o$. The ends of the shuttle are cut away, so as to have a point at one end in line with one side and a point at the opposite end in line with the other side, so that in moving in one direction the shuttle engages and passes through the loop in line with one side of the shuttle and on its return engages with and passes through the loop in line with its opposite side. The internal mechanism of the shuttle may be of any approved form.

We provide a let-off for drawing from the spools or bobbins C a sufficient amount of cord or thread for the knot and the mesh of netting next to be formed. In suitable brackets at the front of the machine are rigidly mounted two rods E E'. Two levers $E^3$ $E^4$, pivoted near the base of the machine, extend upwardly and are provided at or near their upper ends with a bar $E^5$, forming a swinging frame. The bar $E^5$ is provided with cord or thread eyes $e$ $e$, and the cords or threads pass in front of the rods E' E' and are threaded through the eyes on the bar $E^5$ of the swinging frame. This bar is caused to move inward to draw off the proper amount of cord or thread and forward to yield the thread by a cam $N^5$ on the shaft N through the following connecting mechanism: Two levers $e'$ $e'$ are pivoted at $e^2$ $e^2$ to brackets $e^3$ $e^3$, secured to a cross bar or beam of the framing. Each lever is provided with a friction-roll engaging a cam $N^5$, one of which is shown in detail in Fig. 22. Two links $e^4$ $e^4$ connect these levers with the levers $E^3$ $E^4$ of the swinging frame, said links being connected to said levers $E^3$ $E^4$ by bolts $E^8$ passing through slots $E^9$, so that by adjusting the point of connection the amount of movement given to the swinging frame can be increased or diminished, according to the size of the mesh desired. The links $e^4$ $e^4$ may be also made adjustable upon the levers $e'$ $e'$ when desired. The levers $e'$ $e'$ even when in their most forward position are inclined with their lower ends extending rearward of their pivots, and each is provided at its lower end with the rearwardly-curved portion $e^5$, having the counter-weight $e^6$. This weight tends to force the lever $e'$ to a vertical position and maintains the friction-roll secured thereto in contact with the cam and moves the swinging frame outward when permitted to do so by the cam. This weight and the cam serve to move the swinging frame backward and forward to effect the proper letting off of the cord or thread.

At the close of the formation of a series of knots across the fabric the shuttle cord or thread is approximately straight, while the warp cords or threads are wound around the fingers $h$ and $i$ and a portion drawn through the loop thus made by the hooks $o$ $o$. It is essential in tightening the knots that the whole or the greatest amount of force should be applied to the warp-threads. In order to do this and thereby accomplish the proper completion of the knot at the instant that the take-up mechanism begins to act, we apply a strong tension upon each warp-thread. At the front of the machine, below the let-off devices, a bar D extends parallel thereto and is journaled in suitable bearings. To this bar we attach an independent tension device for each warp cord or thread, (see Fig. 13,) consisting of the bracket D', which is rigidly secured to the bar having the upward projection $d$ and the side flanges $d'$, between which is pivoted the weighted lever $D^2$, having a lug $d^2$ projecting from the forward side of the same, and the lug $d^3$ at the upper end of the lever projecting rearwardly.

The lever $D^2$ is pivoted so that it has a slight motion on its pivot, and in its normal position the upper end is held away from the back of the bracket D'. The lever $D^2$ is provided with a aperture $d^4$, passing vertically through the lug $d^2$, an aperture $d^5$, passing horizontally through the upper end of the lever from front to rear, and an aperture $d^6$, passing vertically through the lug $d^3$. The warp cords or threads are threaded through these apertures. The bar D is provided at one end with an upright arm rigidly secured thereto, and this arm is connected with the frame of the machine by a spring $D^3$, which tends to hold the levers $D^2$ in their normal position. At some convenient point we secure to bar D another rigid arm $D^4$, which is provided at its outer end with a friction-roll lying in the path of a cam projection $N^4$ on the periphery of the disk N' on the shaft N. The arrangement is such that when the cam projection strikes the friction-roller on the arm $D^4$ the bar D is turned on its bearings and the levers $D^2$ tilted to the position shown in dotted lines, Fig. 13. In this position the weighted end of the lever forces the upper end against the back of the bracket D' and grips the cord or thread extending between apertures $d^5$ and $d^6$ strongly between them, holding the same with sufficient resistance to enable the take-up mechanism to complete the knots by drawing the shuttle-thread so as to interlock with the warp-thread and tightening the knot.

Before the knots can be tightened the warp-threads must be freed from the fingers or points of the two finger-bars and cast off from the knotting-hooks $o$ $o$. We have already described the mechanism whereby the casting off from the finger-bars is effected, and we will now describe the means employed for casting off the cords or threads from the hooks. Through two or more of the pieces forming the rear portions of the raceways for the shuttles we make openings $r$, running lengthwise of the same from front to rear. In these openings are mounted the sliding rods $r'$, and to these rods, at the front of the rear fluted or toothed roller $P^2$, is secured the cast-off bar R, having a downwardly-projecting lip $r^2$. The rear ends of the rods $r'$ are secured to a bar $r^3$, which is secured to the upper ends of two levers R' $R^2$, each pivoted at $r^4$ to a bracket $R^3$, secured to a cross bar or beam of the frame. The lower ends of the levers R' $R^2$ are each provided with friction-rolls engaging cams $L^4$ $L^5$ on shaft L. A spring $r^5$ connects each lever with the frame, so that the levers R' $R^2$ and the cast-off bar are held in their retracted position when not actuated by the cams.

The cast-off bar R, remaining for a large portion of the time stationary between the toothed roller $P^2$ and the forwardly-projected ends of the shuttle-raceways, prevents the cords or threads from being drawn backward by the shuttle and caught between the shuttles and said roller. A rigid bar S or cord-guard is located in a like position with respect to roller P′ to effect the like function when the shuttles move toward the latter.

Having now described the various parts constituting the mechanism which we employ, we will proceed to describe the relative operation of the same during the formation of netting thereby.

After the cords or threads are placed in position, as herein described, through the tension device, the let-off mechanism, over the rod $b'$, through the eyes $g^3$, the eyelets $g$ of the cord or thread carriers, and thence to the take-up mechanism, so as to be under the control of the latter, the first movement of the machine causes the bar $E^5$ to be moved rearwardly, drawing off from the spools or bobbins a sufficient amount of thread to form a single mesh. The cord or thread carrier then performs its movements, wrapping the thread around the fingers $h$ and $i$, as heretofore set forth. The hooks $o$ $o$ then rise and draw down the loop of warp-cord. The rollers P′ P² are next rotated and the shuttles passed through all of the loops held by the hooks except one. If the shuttles are in the position shown in Fig. 3, the shuttle will pass through the loops drawn down to the left of the centers of the same. The bar $E^5$ of the let-off devices will then be permitted to move forward and loosen the cords. The movable finger-bar (the cast-off bar J) will then be actuated and the warp cords or threads cast off from the finger-bars. The hook cast-off R is next moved to remove the warp-threads from the hooks $o$ $o$. The let-off has previously moved forward and slackened the warp-cords, and as the cords are cast off from the fingers $h$ and $i$ the loops held by the hooks $o$ fall below the points of the same and are moved forward free from the hooks by the cast-off. As soon as the warp-cords have been cast off from the hooks $o$ $o$ the take-up mechanism acts rapidly to take up the slack of the warp and tighten the knots. At the same time the bar D of the tension device is rocked and the weighted levers caused to grip the warp-cords, so that they are drawn taut by the take-up mechanism and the knots tightened. While these parts are effecting this result, the cord-carriers $g$ are returned to the position shown at 1, Fig. 12, ready to commence the formation of a second series of knots. When the cast-off bar J is moved downward, the pins connected therewith cause the angular levers $i^3$ on the points $i'$ to turn on their pivots, permitting the points $i$ to rise and the loops wrapped around these points to fall therefrom. The movement of the take-up mechanism is completed before the cast-off bar J and the movable points $i$ return to their former position, and as the warp-cords are by this time drawn taut as the cast-off J and fingers $i$ resume the required position for the next knot the warp-cords will be again engaged and held up by the short arm of the cord-levers $i^3$. The loop of the warp-thread through which a shuttle-thread has not been passed will be drawn back by the act of taking up the warp and the cord made straight and taut, but without a knot. The next series of movements for forming another series of knots will be the same, except that the shuttles will this time move from front to rear of the machine and will pass through the loops to the right of the centers of the shuttles and the selvage-cord on the left of the fabric be left without a knot.

Instead of having the shuttle-actuating rollers provided with a continuous grooved or toothed periphery, we may provide the shafts with a gear for each shuttle, as shown at $P^4$, Fig. 5.

What we claim, and desire to secure by Letters Patent, is—

1. The herein-described netting-machine, having two finger-bars, with the fingers of one arranged opposite the fingers of the other, with a space between, and a cast-off mechanism.

2. The herein-described netting-machine, organized with two finger-bars, one movable and the other stationary, the fingers of one arranged opposite those of the other, with a space between, and the cast-off mechanism and the cord-carriers.

3. The herein-described combination of the finger-bar having the fingers provided with recesses in one edge thereof with another finger-bar with its fingers opposite those of the first bar, with a space between, and the hooks and hook-frame.

4. The herein-described finger-bar for netting-machines, having its fingers provided near their lower ends with concave edges and above with a recess in one edge.

5. The herein-described combination of the movable finger-bar, the cord-levers, and the cast-off bar carrying pins engaging the cord-levers.

6. The combination hereinbefore set forth of the stationary finger-bar, the movable finger-bar having fingers extending below the fingers of the stationary bar, and the cast-off bar.

7. The tension device consisting of the rock-shaft and the weighted tension-levers and means for operating the rock-shaft, substantially as described.

8. The herein-described netting-shuttle, having at one end a point in line with one side and at the other end a point in line with another side, substantially as described.

9. The herein-described netting-shuttle, having at one end a point in line with one side and at the other end a point in line with the opposite side.

10. The combination hereinbefore set forth of the knotting-hooks and the sliding-hook cast-off.

11. The combination hereinbefore set forth of the divided shuttle-bed, the shuttle-operating gears, the cord-guard, and the hook cast-off.

12. The combination hereinbefore set forth of the finger-bars, the shuttle-bed having raceways in a vertical plane between the vertical planes of the fingers, the shuttles each having a point at one end in line with one side and a point at the other end in line with its opposite side, cord-carriers, and knotting-hooks.

13. The combination hereinbefore set forth of the cast-off bar, the toggle-levers, the sliding rod, and the links connecting the rod and toggle-levers.

14. The combination, with the shuttle-bed, of the hook cast-off bar and sliding rods supporting said bar and sliding in the bars forming the shuttle-raceways, substantially as described.

15. The combination, with the take-up mechanism, of the warp-cord tension consisting of the rock-shaft and weighted tension-levers and means for operating said rock-shaft, substantially as described.

16. The herein-described combination of the movable finger-bar, the cord-levers, and a device for tripping said levers.

17. The herein-described combination of the stationary and movable finger-bars, a cord-supporting device attached to each of the fingers of the movable bar, the shuttle-bed having raceways, shuttles constructed to travel in said raceways, the knotting-hooks, and a cast-off mechanism, the last being connected to and actuating the cord-supporting devices.

18. The herein-described combination of a finger provided with a movable cord-supporter and a cast-off device operating the cord-supporter.

In testimony whereof we affix our signatures in presence of two witnesses.

WILLIAM JOHN HOOPER.
GEORGE T. PILLINGS.
GEORGE W. PRICE.

Witnesses:
FELIX R. SULLIVAN,
H. H. STRYKER,
JAS. MCK. MERRYMAN.